(No Model.)
H. G. ASHTON.
SAFETY VALVE.
No. 395,536. Patented Jan. 1, 1889.
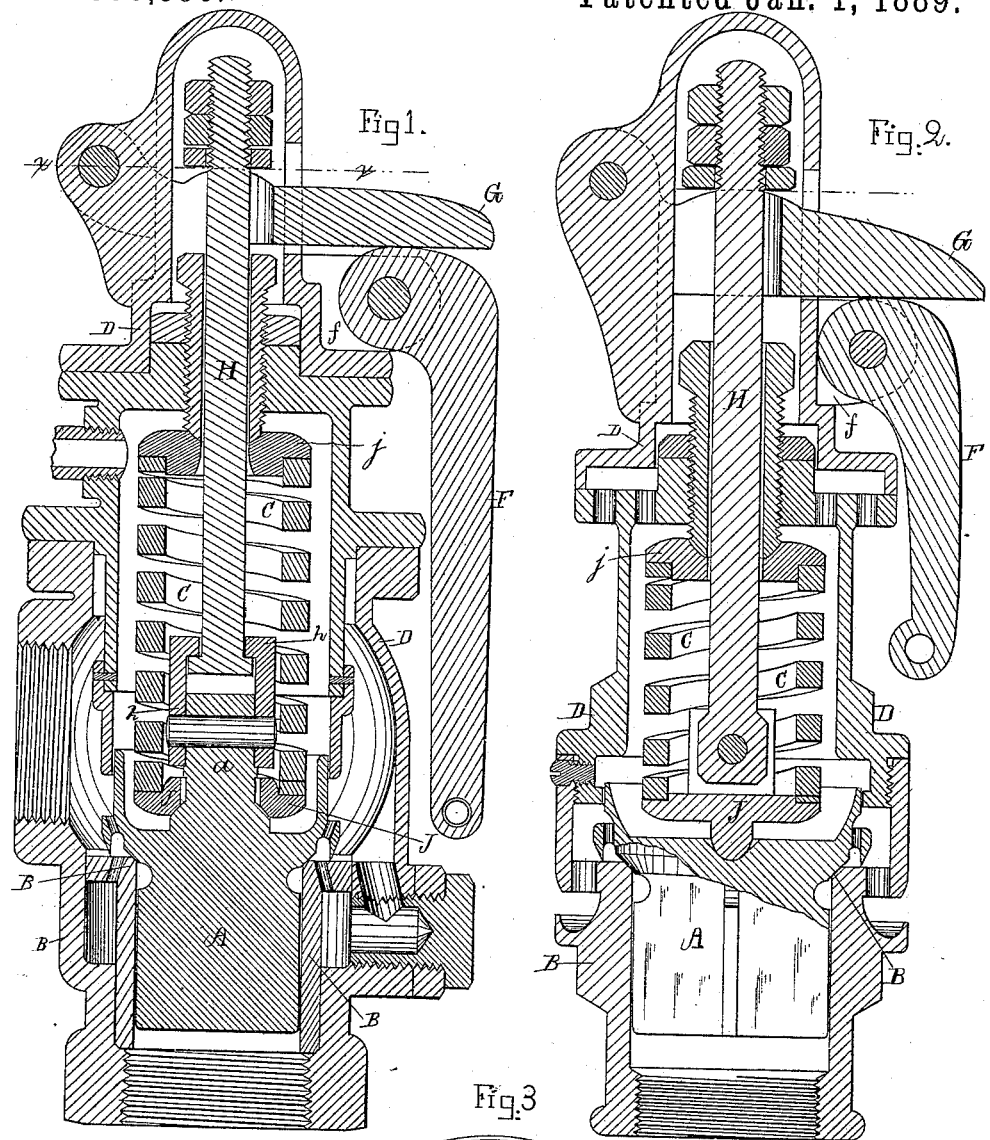
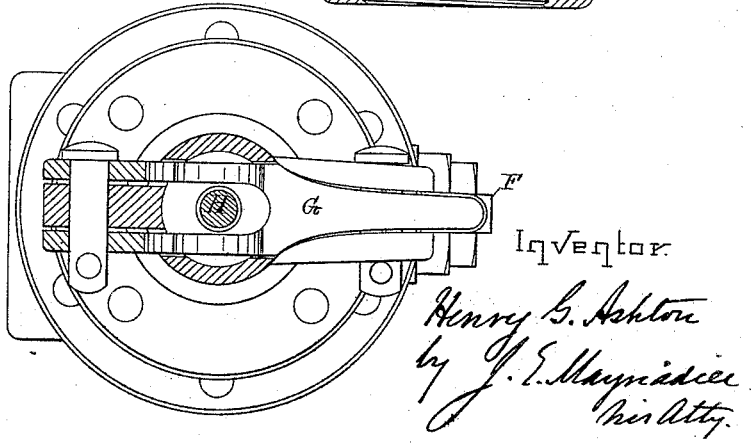
Witnesses.
Lauritz W. Moller
John R. Snow.
Inventor.
Henry G. Ashton
by J. E. Maynadier
his Atty.

UNITED STATES PATENT OFFICE.

HENRY G. ASHTON, OF SOMERVILLE, MASSACHUSETTS.

SAFETY-VALVE.

SPECIFICATION forming part of Letters Patent No. 395,536, dated January 1, 1889.

Application filed June 12, 1885. Serial No. 168,477. (No model.)

*To all whom it may concern:*

Be it known that I, HENRY G. ASHTON, of Somerville, in the county of Middlesex and State of Massachusetts, have invented an Improvement in Safety-Valves, of which the following is a specification, reference being had to the accompanying drawings, making a part hereof, in which—

Figure 1 is a lengthwise section, and Fig. 3 is a section on line $x\ x$ of Fig. 1, illustrating my invention. Fig. 2 shows a modification.

My invention relates to means for taking the load off of the valve whenever desired; and it consists, mainly, in the combination of a cam-lever with the spring of the valve, so that by means of the cam-lever the spring may be compressed and the valve relieved from the force of the spring.

In the drawings, A represents the valve, B its seat, C the spring, and D the casing, all these parts being of any suitable construction, my invention having nothing to do with the particular construction of any of these parts, for it is obviously applicable generally in safety-valves and other like structures.

In order to compress the spring, I employ the cam-lever F, and while in certain classes of valves this lever may be mounted to engage directly with the lower support, J, of the valve-spring, or with the spindle of the valve, or with a rim, flange, or boss cast on or attached to the valve, I have found that in practice those forms of my invention shown in the drawings are preferable to other forms which I have contemplated.

The cam-lever F is preferably journaled in the ears or lugs $f\ f$, cast on the casing D, and acts upon the short lever G, which acts upon the spindle H, which is either connected with the valve or with the spring-support J.

In Fig. 1 the motion of the cam-lever not only compresses the spring, but also lifts the valve positively from its seat, while in Fig. 2 the motion of the cam-lever simply compresses the spring, and thereby takes its pressure off of the valve.

A feature of my construction lies in the combination of the spindle H with the spring and its supports by means of a hole through the upper support, $j$, and a jointed connection between the spindle and the lower support, J, or between the spindle and the valve, the purpose being to prevent the spindle from being canted, so as to bind in the hole in the upper support, $j$, through which the upper part passes, and I construct my valve in this way to prevent the canting of the spindle, and thereby causing it to bind in its support as the valve moves on its axis, as it constantly does when in use; but all this will be plain to all skilled in the art without further mention.

It will be seen that the form of the cam-lever F is such that when the lever is horizontal the tension of the spring does not throw the lever down, but the lever holds the spring compressed until the lever is moved to allow the spring to move toward the seat of the valve A—that is, the cam-lever F is formed with a flat surface at $f'$, and when the cam is moved on its fulcrum into a position at right angles to the body of the valve to move the lever G on its fulcrum, and thereby compress the spring C, this flat surface $f'$ is against the flat surface $f^2$ of the lever G, and as the cam is now past its center the spring is held compressed. In other words, the parts F and G are shaped as explained, so that when in this position no power needs to be applied to the lever F to retain the spring in its compressed position.

It will be plain to all skilled in the art that by this construction all the steam in the boiler is readily blown out, if desired, by a single pull upon the lever.

I am aware of Linnard's patent, No. 90,278, dated May 18, 1869, and disclaim all that is shown in it, my valve differing radically from Linnard's in that when my cam-lever is moved into the position which it takes in holding the spring compressed it remains in that position until force is applied to the lever to move it so as to relieve the spring, while in Linnard's valve the cam shown in Fig. 4 does not retain the spring in its compressed position, unless some power is applied to hold the cam in the position which it takes when the spring is compressed—that is, my cam-lever keeps my spring compressed automatically, while the tension of Linnard's compressed spring causes the lever and its cam to move to relieve the spring, unless the cam is locked or constantly held in the position which it takes when the spring is compressed.

I am aware of Bouton's patent, No. 10,800, of April 18, 1854, Ashcroft's patent, No. 86,346, of February 2, 1869, and English Patent No. 30 of 1873, and disclaim all that is shown in them, my improved valve differing radically from the valves shown in these patents in that the spring is held compressed after the cam-lever is moved into position to compress the spring to keep the valve off its seat.

What I claim is—

In a safety-valve, the cam-lever F, having a flat surface, $f'$, in combination with a lever, G, having a flat surface, $f^2$, and the valve-spring, the levers and the spring being arranged substantially as shown, to keep the spring compressed when the flat surfaces $f'\ f^2$ are against each other, all substantially as and for the purpose set forth.

HENRY G. ASHTON.

Witnesses:
WM. A. COPELAND,
JOHN R. SNOW.